UNITED STATES PATENT OFFICE.

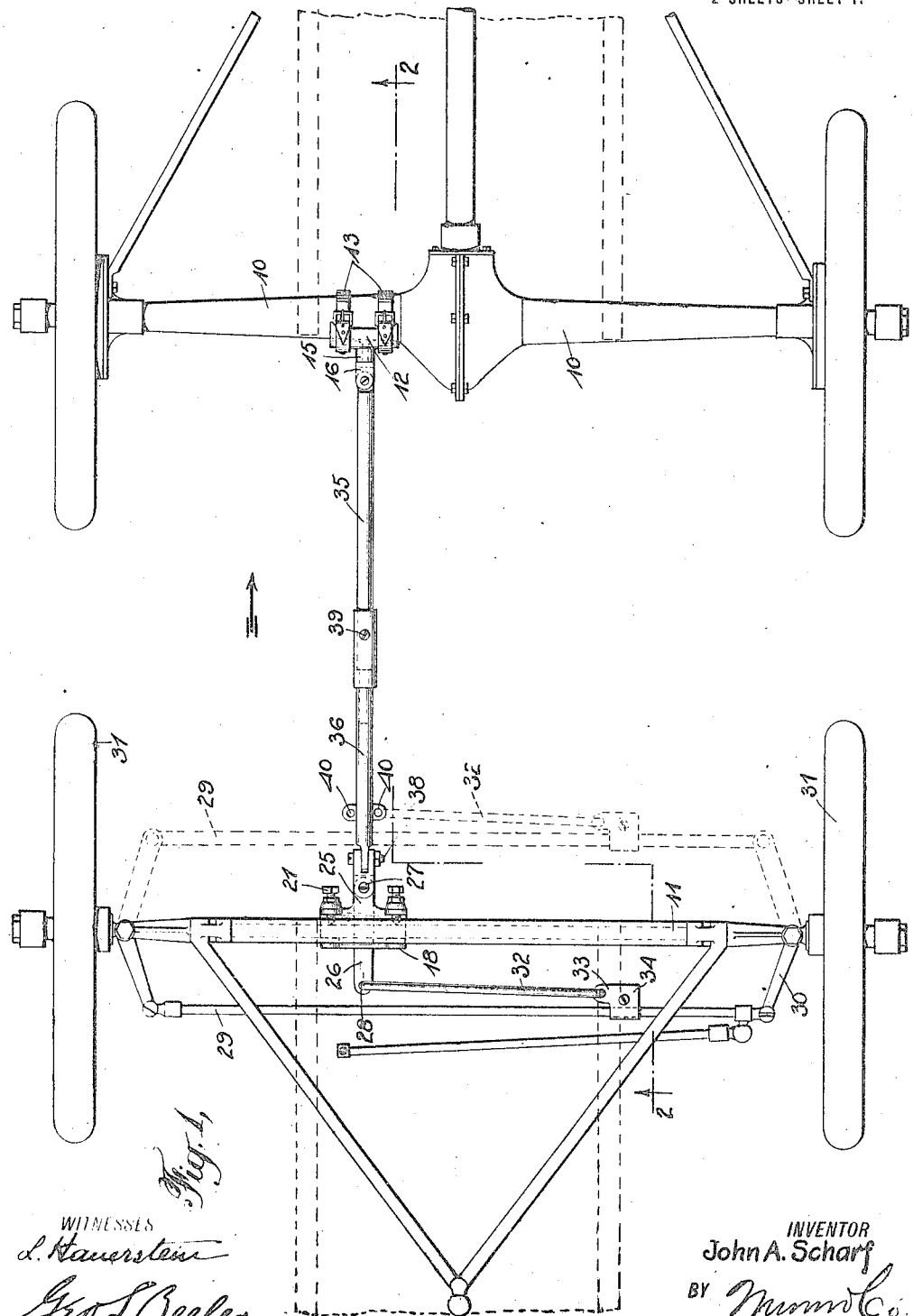

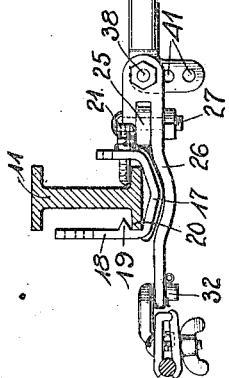

JOHN A. SCHARF, OF RICHWOOD, OHIO.

AUTOMOBILE TRAILER-COUPLING.

1,157,590.  Specification of Letters Patent.  Patented Oct. 19, 1915.

Application filed October 23, 1914. Serial No. 868,204.

*To all whom it may concern:*

Be it known that I, JOHN A. SCHARF, a citizen of the United States, and a resident of Richwood, in the county of Union and State of Ohio, have invented a new and Improved Automobile Trailer-Coupling, of which the following is a full, clear, and exact description.

This invention relates to propelling or traction devices for automobiles, and has particular reference to means for connecting a dead or disabled automobile to another for the purpose of being drawn by the latter.

Among the objects of the invention is to improve this class of devices whereby an automobile of any design, make or type may be drawn in the rear of another automobile, the machine being so drawn not requiring any attention for steering purposes or otherwise independently of the control of the traction vehicle.

The foregoing and other objects of the invention will hereinafter be more fully described and claimed and illustrated in the drawings forming a part of this specification in which like characters of reference indicate corresponding parts in all the views, and in which—

Figure 1 is a plan view showing the rear axle of a traction vehicle, the front axle of a disabled vehicle and a preferred embodiment of my invention connecting these two axles whereby the disabled vehicle will be both drawn and steered automatically from the traction vehicle; Fig. 2 is a vertical longitudinal section on the broken line 2—2 of Fig. 1; Fig. 3 is a view corresponding to the rear portion of Fig. 2, but showing a modified form of the invention; and Fig. 4 is a detached view indicating the principal parts of the invention in perspective.

The several parts of the device may be made of any suitable materials, and the relative sizes and proportions, as well as the general design of the mechanism, may be varied to a considerable degree without departing from the spirit of the invention hereinafter more fully described and specifically claimed.

At 10 is shown the rear axle of what is termed herein as a traction vehicle or one which is being used to draw a dead or disabled vehicle whose front axle is shown at 11, the direction of movement being indicated by the arrow on Fig. 1.

The axle 10 is usually of tubular form, but irrespective of the precise size or form thereof it is adapted to have secured to it a semi-cylindrical or concave head 12 to which a pair of straps 13 are connected for making connection with the axle. The inner face of the head 12 may be lined with leather, felt or other means 14 to prevent abrasion or other damage to the axle to which the coupling is made.

15 indicates a hub formed upon the outer surface of the head 12 and having its axis substantially perpendicular to the axis of the shaft 10.

A knuckle 16 is swiveled in the hub 15 and hence is adapted to rotate around the axis thereof, so as to compensate for any irregularities in the roadway tending to tilt the rear axle of the vehicle in any direction.

At 17 I show a sort of clamp member which will be distinguished hereinafter by the term "cradle", the same being adapted to embrace the lower portion of a front axle 11 of I-beam form, as shown in Figs. 1 and 2, and the function of this cradle is to make rigid connection with such axle. This cradle member comprises a pair of standards 18 which extend up in the rear of the axle and have secured to their front faces a pair of lugs 19 not far remote from the bottom of the cradle and adapted to engage over the bottom flange 20 of the I-beam, as shown in Fig. 2. The upper and lower faces of these lugs are inclined so as to adapt these features to axles of different sizes, the axle flange in any case fitting between the lugs and the bottom of the cradle. The front edge of the bottom flange may fit within the cradle with any degree of looseness, the clamping effect being completed by means coöperating with the front portion of the axle shown in Figs. 1 and 2 as a pair of set screws 21 acting against or above the front portion of said bottom flange 20. The set screws are shown as operating through a pair of upwardly projecting ears 22 having holes 23 therein, and the aforesaid standards are also provided at their upper ends with holes 24. A lug 25 is formed preferably integral with the bottom of the cradle and projects forwardly therefrom at its center, said lug being provided with a central vertical hole.

At 26 I show a lever of peculiar form and construction, the same being in the nature of a lever of the first class pivoted intermediate its ends upon a pivot 27 passing through the hole aforesaid in the lug 25. The lever thus is bifurcated to receive said lug 25 and at its front and shorter arm it is provided with a vertical bifurcation through which a transverse pivot hole is formed at right angles to the pivot 27. The longer arm of the lever extends rearwardly beneath the cradle and has a hole 28 formed at the rear extremity thereof. The lever is adapted to swing around the pivot 27 independently of the cradle.

At 29 I show a common and well known type of tie rod connecting the front steering knuckles 30 so as to hold the front wheels 31 in parallelism.

32 indicates a connecting rod having one end pivoted in the hole 28 and the other end in an ear 33 of a clamp 34 adapted to be secured to said tie rod whereby the movement of the lever 26 around its pivot 27 serves to steer the wheels 31 in a corresponding direction or whereby the normal draft upon the lever 26 will maintain the disabled vehicle in proper alinement with the traction vehicle. Any suitable coupling rod is adapted to connect the parts above described, namely, the knuckle 16 of the head attached to the traction axle and the bifurcated front end of the lever 26 pivoted to the cradle. This coupling rod is shown in its preferred form as comprising front and rear sections 35 and 36 pivoted respectively to the knuckle 16 through a pivot pin 37 and to the front end of the lever 26 through a pivot pin 38. These two sections are detachably connected in the middle by means of a pin 39. By removing this pin 39, the two rod sections may be swung upwardly or around out of the way if the disconnection is to be temporary between the two vehicles.

When the tie rod 29 is located in front of the axle as indicated in Fig. 1 in dotted lines, the connecting rod 32 may be secured thereto in the same manner as above described, but instead of the connecting rod being pivoted to the lever 26, it, in such event, would be pivoted in one of the ears 40 extending laterally from the section 36 just in front of its rear end. The said rear end of the section 36 is bent preferably substantially at a right angle and provided with several holes 41 through any one of which the pivot pin 38 may pass so as to vary the horizontal position of the coupling rod to accommodate the tie rod if the latter is located in front of the front axle.

Referring now to Fig. 3, in which the coupling is to be made with a round axle 11', it will be noted that all of the parts heretofore described are used, said axle being gripped along its lower portion between the lugs 19 and the points of the set screws 21 and the upper portion of the shaft 11' is gripped by a peculiar form of cap 42 having spurs 43 on its lower surface adapted to engage the top of the shaft. The cap is provided with a pair of fingers 44 which extend rearwardly through certain of the holes 24 of the standards 18, depending upon the size of the shaft, and a pair of hook-shaped bolts 45 coöperate with the front portion of the cap 42 and with the holes 23 in ears 22. Upon tightening the bolts 45 the clamp will be securely set upon the shaft 11'.

From the foregoing description of the mechanism, it will be appreciated that the coupling and steering device may be quickly and easily applied to the rear axle of a traction vehicle and to the front axle and steering tie rod of a disabled vehicle, and because of the connections described the operation of the traction vehicle in the usual way will result in drawing the disabled vehicle after it without being steered by any other means.

I claim:

1. In an automobile trailer coupling, the combination of a cradle adapted to embrace the lower portion of the trailer axle, said cradle including a pair of upwardly projecting ears having holes at their upper ends along one edge of the cradle and also including a pair of vertical standards each having a plurality of holes at its free end along the opposite edge of the cradle, a pair of set screws acting through said ears below the holes thereof for binding coöperation with the axle, a cap coöperating with the cradle above the axle and having a pair of fingers projecting through certain of the standard holes, a pair of hooks coöperating with the opposite portion of the cap from the fingers and extending into the holes of the ears aforesaid, and means extending from the cradle to the steering device of the trailer and to the rear axle of the traction vehicle, substantially as and for the purposes set forth.

2. In an automobile trailer coupling, the combination of a cradle adapted to embrace the lower portion of the trailer axle and means including a pair of beveled lugs and a pair of set screws to secure the cradle rigidly to said axle, said cradle also having a lug extending forwardly from the middle thereof and having a vertical hole, a lever of the first class embracing said lug, a pivot pin passing through said lug hole and connecting the lever thereto, the rear arm of the lever extending below the cradle and adapted for movement independently thereof, means to connect the rear end of said arm to the steering gear of the trailer, and means extending forwardly from the front arm of said lever to connect the same with a traction vehicle.

In testimony whereof I have signed my name to this specification in the presence of two subscribing witnesses.

JOHN A. SCHARF.

Witnesses:
 JOHN W. MOORE,
 SETH L. LEWIS.